US008327354B1

United States Patent
Magenheimer et al.

(10) Patent No.: US 8,327,354 B1
(45) Date of Patent: Dec. 4, 2012

(54) VIRTUALIZATION WITH BINARY TRANSLATION

(75) Inventors: Daniel J. Magenheimer, Fort Collins, CO (US); Parthasarathy Ranganathan, Fremont, CA (US); Matthew Chapman, North Ryde (AU)

(73) Assignee: Hewlett-Packard Development Company, L.P., Houston, TX (US)

( * ) Notice: Subject to any disclaimer, the term of this patent is extended or adjusted under 35 U.S.C. 154(b) by 1587 days.

(21) Appl. No.: 11/756,125

(22) Filed: May 31, 2007

(51) Int. Cl.
*G06F 9/455* (2006.01)
*G06F 9/26* (2006.01)
(52) U.S. Cl. .......................... 718/1; 711/206
(58) Field of Classification Search .................. None
See application file for complete search history.

(56) References Cited

U.S. PATENT DOCUMENTS

| | | | | |
|---|---|---|---|---|
| 6,502,237 | B1 * | 12/2002 | Yates et al. .................... | 717/136 |
| 6,704,925 | B1 * | 3/2004 | Bugnion ........................ | 717/138 |
| 7,277,998 | B1 * | 10/2007 | Agesen et al. ................. | 711/163 |
| 2006/0005186 | A1 * | 1/2006 | Neil ............................... | 718/1 |

OTHER PUBLICATIONS

Chapman, M. et al., "Implementing Transparent Shared Memory on Clusters Using Virtual Machines", Proc. of USENIX 05, Anaheim, CA, Apr. 2005.
Graupner, S. et al., "Impact of Virtualization on Management Systems", HP Laboratories Palo Alto, HPL-2003-125, Jun. 23, 2003.
Pratt, I. et al., "Xen 3.0 and the Art of Virtualization", p. 65-77, Proc. of the Linux Symposium, vol. 2, Jul. 2005, Ontario, Canada.
Rose, R., "Survey of System Virtualization Techniques", Mar. 2004.
Rosenblum, M., "The Impact of Virtualization on Computer Architecture and Operating Systems", VMWare, downloaded May 21, 2007.

* cited by examiner

*Primary Examiner* — Camquy Truong (57) ABSTRACT

A system for providing virtualization that includes a processor operable to execute one or more machine-readable instructions, the processor having a native instruction set architecture (ISA) and a virtual machine monitor (VMM) operable to host at least a first virtual machine having a first ISA different from the native ISA, the VMM having integrated therein a first dynamic binary translation (DBT) layer to assist in an execution of a first application of the first ISA in the first virtual machine by the processor having the native ISA.

21 Claims, 6 Drawing Sheets

VIRTUALIZATION WITH BINARY TRANSLATION

BACKGROUND

Virtual machine technology, or virtualization, is rapidly emerging to become an integral component of future information technology (IT) systems. As referred herein, and as understood in the art, information technology, or IT, encompasses all forms of technology, including but not limited to the design, development, installation, and implementation of hardware and software information or computing systems and software applications, used to create, store, exchange and utilize information in its various forms including but not limited to business data, conversations, still images, motion pictures and multimedia presentations technology and with the design, development, installation, and implementation of information systems and applications. IT distributed environments may be employed, for example, by Internet Service Providers (ISP), web merchants, and web search engines to provide IT applications and services to users.

Figure 1:
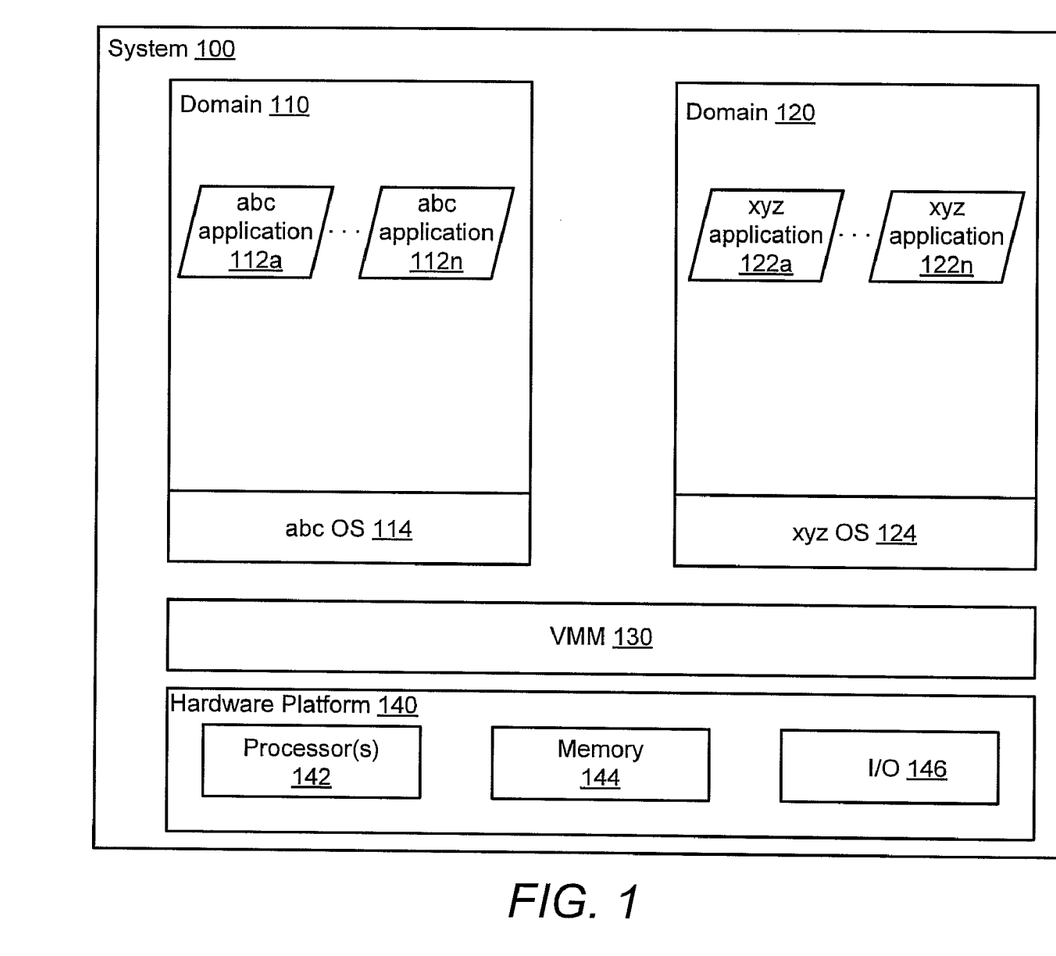
FIG. 1 illustrates a typical set-up for providing virtualization in a system wherein one or more embodiments may be practiced.

Virtual machine technology provides three primary features. It allows multiple operating environments to reside on the same physical machine; it provides fault and security isolation which can be tied to guaranteed service levels; and it allows the entire state of the "machine"—memory, disk images, I/O state, etc.—to be captured, saved, and potentially reused. In turn, these three features of virtualization enable applications such as server consolidation, resource provisioning, software delivery, security, availability, debugging, simulation, etc. FIG. 1 illustrates a typical set-up for providing virtualization in a system 100, which is a physical machine that includes both hardware and software. Examples of a system 100 include but are not limited to a desktop or laptop personal computer (PC), a server, a mainframe. The system hardware is represented by the hardware platform 140 having one or more processors 142, one or more memory devices 144, and one or more I/O devices 146 arranged and in communication with each other in a manner known in the art. The system software includes a software virtualization layer 130, also called a virtual machine monitor or hypervisor, to simultaneously support multiple operating system instances 114 and 124 in multiple virtual machines or domains 110 and 120. These can be multiple instances of the same operating system or of different operating systems. The virtualization layer 130 is operable to share the computing resources of the underlying hardware platform 140 between the multiple operating system instances. A number of hardware- and software-based virtualization solutions are commercially available. However, these solutions focus on the partitioning, isolation, and encapsulation features of virtual machines and their use for different applications mainly in the context of a specific processor architecture.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

As referred herein, an instruction set architecture (ISA) defines the boundary between machine hardware and software, and includes a set of instructions and rules about how those instructions execute under various circumstances. On most machines, the hardware enforces some concept of privilege and software is executed in either privileged mode or unprivileged (or user) mode. Similarly, an ISA may be subdivided into two parts: a system ISA and a user ISA. In general, the system ISA includes instructions that are privileged, while the user ISA includes instructions that are unprivileged. If software executing in user mode (e.g., an application) attempts to execute a privileged instruction, the hardware forbids the execution by invoking a trap, which delivers control to privileged code (generally an operating system). This allows the operating system (OS) to isolate applications from each other and to provide an illusion that each application owns all of the machine's resources (thus providing the foundation for multi-programming). Because an application may wish to control the machine in ways that are privileged, an OS provides an abstract interface to privileged functionality through a set of system calls. Thus, an application may execute code either of the user ISA or system calls to the OS. The sum of these two is called an application binary interface (ABI).

As also referred herein, a virtual appliance is an encapsulation of the application and OS bits required for a workload, targeted at a particular virtual machine platform.

As further referred herein, dynamic binary translation or translator (DBT), as its name implies, is runtime compilation of a binary image from one architecture (ISA) so that the resultant code will run on another architecture (ISA). The translation occurs between a source environment and a target environment. The exact characteristics of both the source and target environments yield a variety of types of translators. There exist dynamic binary translators called cross-ISA-same-OS translators that are operable to provide runtime compilation of a binary image from one ISA to another but retain the same OS. Those translators that allow different source and target OS'es are called cross-ISA-cross-OS translators. Also, those translators that allow binary translation between two same architectures with the same OS are called same-ISA-same-OS translators. It should be understood that the term "ISA" in the aforementioned translators refer to user ISA that is being translated, and not the system ISA.

Described herein are methods and systems for integrating an interface transformation layer to virtualization by adding dynamic transformation of the hardware interface to virtualization. In one embodiment, this is achieved by combining conventional virtualization functionality with a DBT that provides dynamic binary translation of the full instruction set architecture (ISA) that includes both user and system ISAs. Such a combination significantly increases the benefits from current applications of virtualization, such as server consolidation and resource provisioning, while potentially enabling additional new uses of virtualization matching with emerging trends such as virtual appliances and heterogeneous hardware.

According to one embodiment, virtualization is implemented on a physical or hardware machine/platform, wherein there is provided a virtual machine monitor (VMM) (also known as a hypervisor) which enforces and abstracts the system ISA to support multiple OS'es (also known as guest OS'es) on the same physical machine, each with its own set of applications. In another embodiment, "cross-ISA" virtualization is provided to allow, for example a virtual appliance intended for one CPU architecture or ISA (e.g., x86) to transparently execute on a different CPU architecture or ISA (e.g., IA-64 or Itanium, SPARC).

Figure 2:
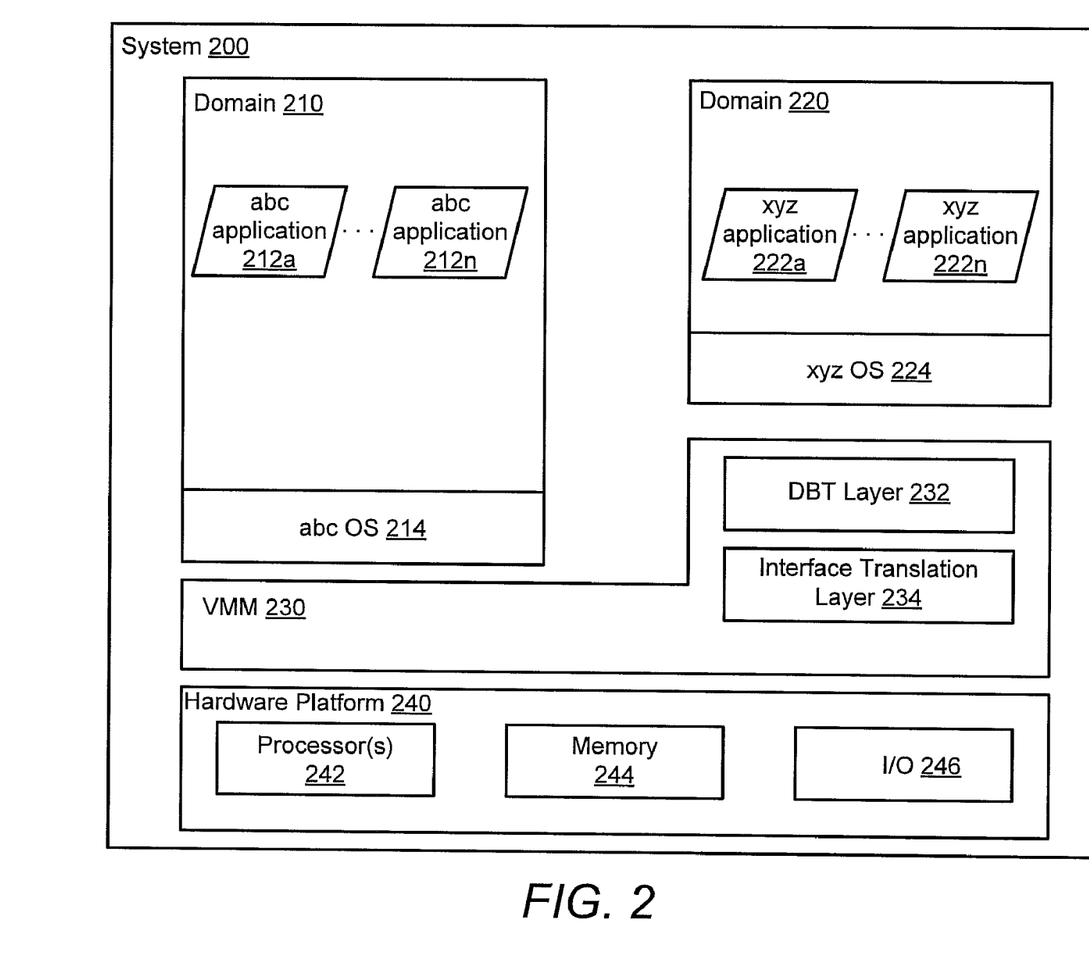
FIG. 2 illustrates a high-level system 200 for implementing cross-ISA virtualization on a single physical machine, in accordance with one embodiment.

FIG. 2 illustrates a high-level system 200 for implementing cross-ISA virtualization on a single physical machine, in accordance with one embodiment. The system 200 is a physical machine that includes both hardware and software. Examples of a system 200 include but are not limited to a desktop or laptop personal computer (PC), a server, a mainframe. The system hardware is the underlying hardware platform 240 that typically includes one or more central processing units (CPUs) or processors 242, one or more memory devices 244, and one or more Input/Output (I/O) devices 246 arranged in a manner known in the art and in communication with each other via one or more communication buses (not shown). The processor 242 includes one or processors of any of a number of computer processors, such as processors from Intel, AMD, or Cyrix. Each processor is coupled to or includes at least one memory device 244, such as a computer readable medium (CRM). Examples of a CRM include but are not limited to an electronic, optical, magnetic, or other storage or transmission device capable of providing a processor, such as the processor 242, with computer-readable instructions. Other examples of a suitable CRM include, but are not limited to, a floppy disk, CD-ROM, DVD, magnetic disk, memory chip, ROM, RAM, an ASIC, a configured processor, any optical medium, any magnetic tape or any other magnetic medium, or any other medium from which a computer processor is operable to read instructions. The system software resides in the memory device 244 for execution by the processor 242. The processor is operable to execute machine-readable instructions stored in the CRM, such as computer-executable program instructions like program code of applications, to run the applications. The computer-executable program instructions include code from any suitable computer-programming language, such as C, C++, C#, Java, or the like.

The system 200 is operable to host multiple domains, two of which are shown as 210 and 220. Each domain is an individual virtual machine running on the hardware platform 240 with a separate OS instance (214 and 224) and with the same or different ISAs. For example, software applications 212a-n in the domain 210 may run in one instance of an OS 214, and software applications 222a-n in the domain 220 may run in another instance of an OS 224, wherein the underlying OS type of the OS instances 214 and 224 may be the same (e.g., Linux) or different (e.g., Linux for 214 and Windows for 224). Furthermore, the domains 210 and 220 may have different ISAs. For example, the domain 210 may operate on an Itanium (IA-64) ISA, and the domain 220 may operate on an IA-32 or SPARC ISA. A domain that has the same ISA as the ISA of ISA of the processor 242 (processor ISA or native ISA) is considered a native domain. A domain that has a different ISA from the processor ISA is considered as a guest-ISA domain.

The system 200 further includes a system VMM or hypervisor 230 that is mated with an application-level binary translator, as represented by the DBT layer 232, that has been augmented with a system ISA translation support wrapper, as represented by the interface translation layer 234, to allow virtual machines of one ISA to run on a physical machine of another ISA. The DBT layer 232, which may be considered a software implementation of the user ISA for a domain (210 or 220) provides the core binary translation functions. The interface translation layer 234 is a transformation layer that handles system-level instructions and emulates the application programming interfaces (APIs) for the guest-ISA environment that is used to operate the guest-ISA domain 220.

According to one embodiment, a guest domain in the system 200, such as the domain 220, is initially paravirtualized prior to its migration to the system 200 for virtualization therein. As understood in the art, paravirtualization of a virtual machine, such as the guest-ISA domain 220, refers to the modification of the guest kernel of the guest OS 224 to make hypercalls, or calls to the hypervisor such as the VMM 230. This allows operating systems that support transparent paravirtualization to run both natively and as a VMM guest. The guest kernel of the guest-ISA domain 220 performs hypercalls to the VMM 230 by branching to offsets within a special page. That page is filled out by the VMM 230 at startup as described later. Thus, the VMM 230 is operable to provide an emulated ISA environment for a virtual machine or virtual appliance as needed for operation in the system 200, wherein the emulated ISA environment is in terms of the APIs for the processor ISA.

In operation, if there is a native domain (e.g., the domain 210) that has the same ISA as that of the processor 242, any existing suitable VMM or hypervisor may be used for the VMM 230 to operate the domain 200 and run applications therein. The VMM 230 may host multiple native domains. However, if there is a guest domain (e.g., the domain 220) that has a different ISA from the ISA of the processor 242, the same existing VMM may be integrated with a DBT layer 232 and a transformation layer 234 to form the VMM 230, which remains operable to host native domains. For each guest-ISA domain, there is a corresponding DBT layer 232 and a transformation layer 234. The VMM 230 may host multiple guest-ISA domains as well. Accordingly, by combining virtual machine techniques with DBT, the VMM 230 is operable to proactively determine each instruction of a running virtual machine (domain 210 or 220) and transform or translate it dynamically as needed for execution by the underlying hardware platform 240.

Figure 3:
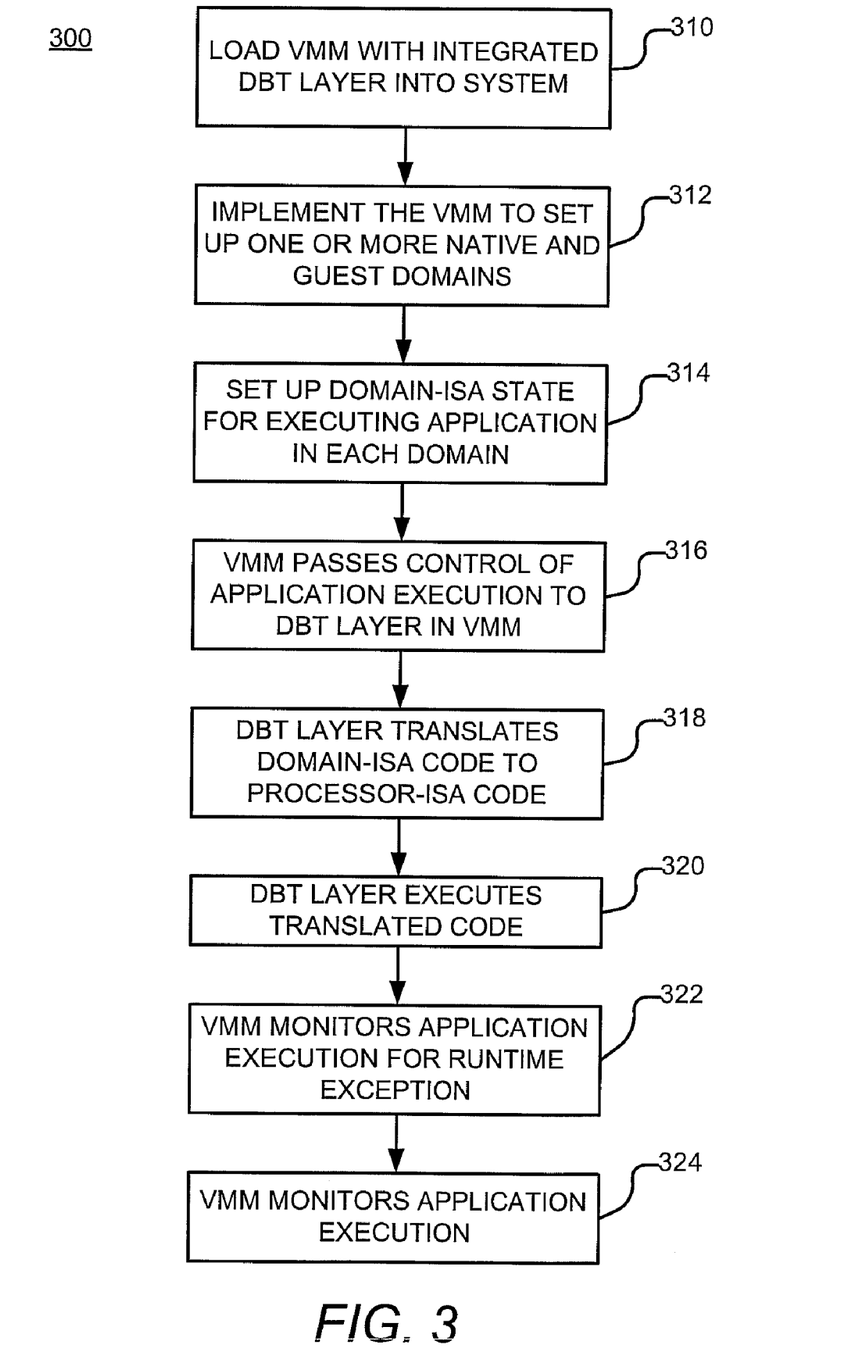
FIG. 3 illustrates a process or method 300 for implementing cross-ISA virtualization on a hardware platform, in accordance with one embodiment.

FIG. 3 illustrates a process or method 300 for implementing cross-ISA virtualization on a hardware platform, in accordance with one embodiment. For illustrative purposes only and not to be limiting thereof, the method 300 is discussed in the context of the system 200 illustrated in FIG. 2. Also for illustrative purposes only and not to be limiting thereof, the method 300 is further described with reference to a virtualization example to assist the readers in the understanding of the method. In this example, the underlying hardware platform 240 employs Intel's Itanium processors with the well-known Itanium ISA. The domain 210 is a virtual machine that operates an Itanium Linux OS 214 to run Itanium applications 212a-n therein in accordance with the Itanium ISA. On the other hand, the domain 220 is a virtual machine that operates an IA-32 (x86) Linux OS 224 to run IA-32 applications 222*a-n* therein in accordance with the IA-32 ISA. The VMM 230 uses a commercially-available Xen IA-64 VMM as a foundation to integrate the DBT layer 232 and interface translation layer 234. The DBT layer 232 is a commercially-available IA-32 execution layer (IA-32 EL), that is augmented with the interface translation layer 234. The DBT layer 232 may be considered as a software implementation of the user IA-32 ISA. The interface translation layer 234 may be considered as a system ISA translation support wrapper.

As noted earlier, an existing VMM, such as the commercially-available Xen IA-64, may be leveraged as a foundation for implementing the VMM 230. With the VMM 230, the system 200 is operable to provide virtualization that allows multiple operating environments to reside on the same physical machine. Thus, if an operating environment is the native domain 210 that has an OS 214 using the same IA-64 ISA as used by the platform 240, any existing suitable VMM 230, such as the Xen IA-64 hypervisor 230, may be used to run such an environment and applications therein in a manner known in the art. To implement cross-ISA virtualization for operation of a guest-ISA domain 220 (which uses, e.g., the IA-32 ISA that is different from the processor IA-64 ISA), the method 300 leverages the existing VMM 230 by integrating therein a DBT layer 232 that is augmented with the interface translation layer 234. As noted earlier, the DBT layer 232 provides application-level dynamic binary translation of the user ISA in the domain 220, and the transformation layer 234 handles system-level instructions and emulates APIs for the emulated ISA environment (e.g., an emulated IA-32 environment) in the domain 220.

Referring to the method 300 in FIG. 2, to start up at 310, the VMM 230, with its integrated DBT and interface translation layers, is loaded in the system 200. To that effect, the VMM 230 is packaged into a loader binary which uses the native domain boot protocol, so that it may be started in the same way as a native domain. For example, because the native domain 210 is a Linux domain, the Linux boot protocol is used so that the VMM 230 may be started in the same way as the Linux domain 210. Accordingly, the loader binary is specified instead of an Itanium Linux kernel, and the IA-32 guest kernel is specified in place of an initial RAM disk for the native domain 210. The loader binary contains the runtime components of the VMM 230 as well as the components for the integrated DBT layer 232 and interface translation layer 234.

At 312, the loader binary relocates these components to their runtime locations in the system 200, establishes virtual mappings, switches to virtual mode, and starts or implements the VMM 230. The loader binary or memory is then no longer needed and may be reclaimed. Once started, the VMM 230 is responsible for installing an interruption vector table, which is a table of entry points for handling processor exceptions generated by the domain 220. It also sets up an initial guest-ISA environment for the domain 220 and native-ISA environment for the domain 210, including register state, initial page tables, and a memory structure containing VMM-specific startup information for the guest OS in the guest ISA environment. Thus, in the running example, the VMM 230 sets up an initial IA-32 environment for emulation in the domain 220.

At 314, when an application, such as an IA-32 application, is executed in the guest-ISA domain 220, the IA-32 environment sets up the IA-32 state for the IA-32 application in the memory buffer of the system 200.

At 316, the VMM 230 passes control of the application execution to a fetch-and-execute loop of the DBT layer 232 (e.g., the IA-32 EL), which then loads the guest-ISA state (e.g., the IA-32 state) to the hardware registers for application-level ISA translation and execution.

At 318, during runtime, the DBT layer 232 dynamically translates the guest-ISA basic blocks (e.g., the IA-32 basic blocks) of code for the guest-ISA state in the hardware registers into processor-ISA code for execution.

At 320, the DBT layer 232 executes the translated code with the processor 242.

At 322, the VMM 230 constantly monitors the application execution to determine whether there is a runtime exception.

At 324, upon determining that there is a runtime exception, the runtime exception is handled by the VMM 230 as follows: control of the application execution by the DBT layer 232 is returned to the VMM 230, which then handles the runtime exception without use of the DBT layer 232 therein and returns control of the application execution once the runtime exception has been handled.

Figure 4A:
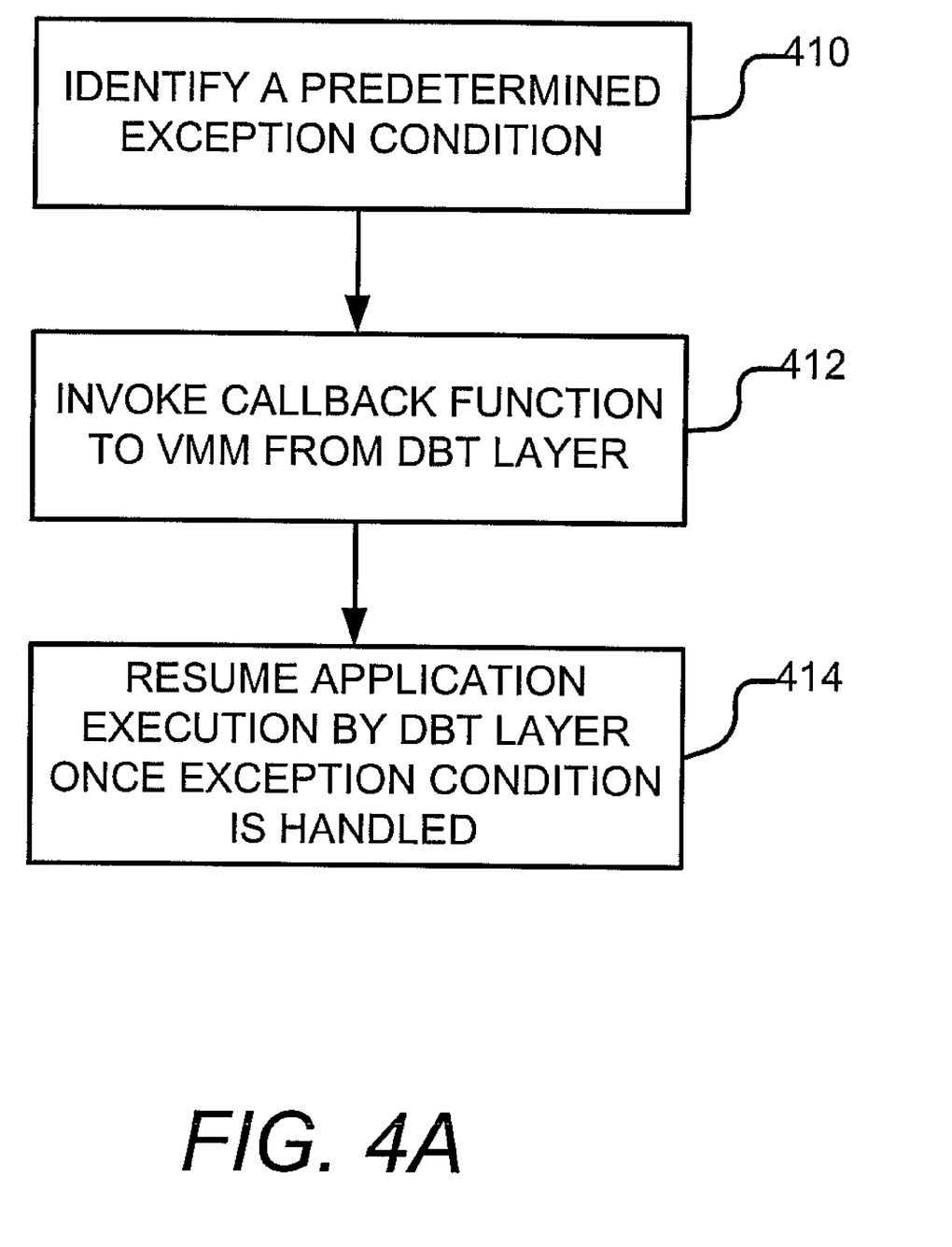
FIGS. 4A-C illustrate further details of a portion of the method illustrated in FIG. 3, in accordance with one embodiment.
Figure 4B:
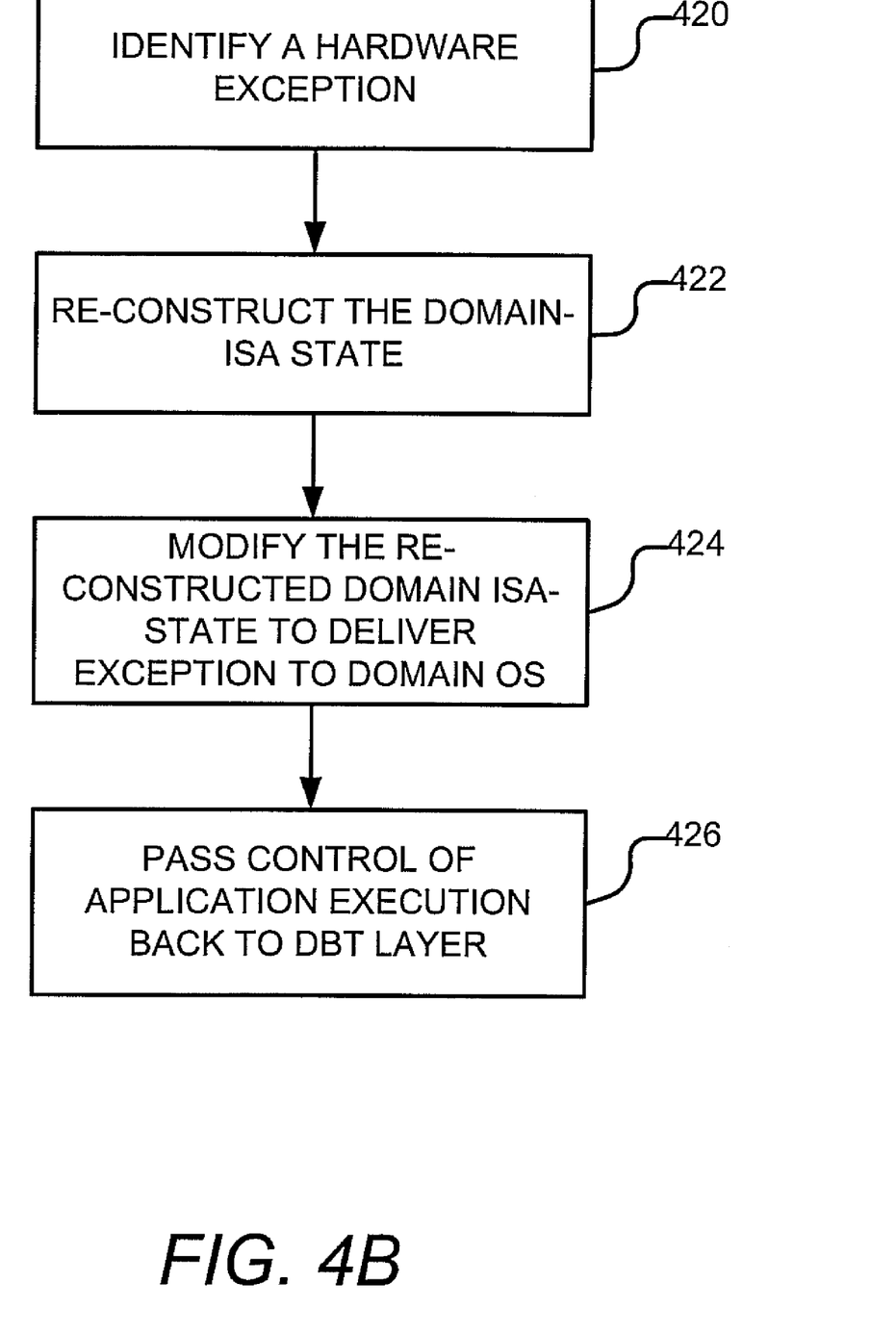
Figure 4C:
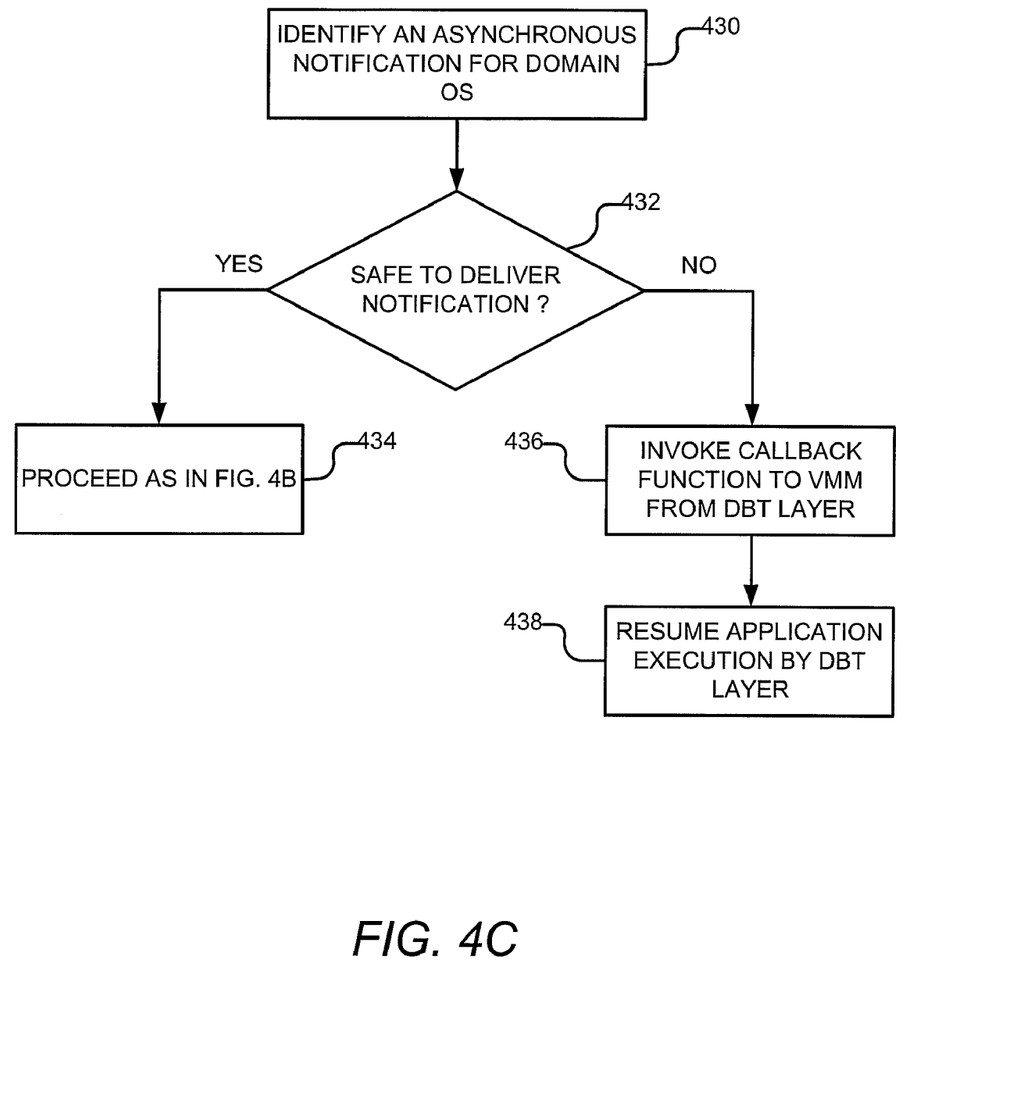

FIGS. 4A-C illustrate the detailed handling at 324 of different runtime exceptions in accordance with one embodiment. Control is returned to VMM 230 when one of the following runtime exceptions happens:

(1) In FIG. 4A, at 410, the DBT layer 232 encounters or identifies from within the DBT layer 232 that there is a predetermined exception condition such as a privileged instruction or hypercalls from the execution of one of the applications 222*a-n* or the guest OS 224. At 412, the guest-ISA state (e.g., the IA-32 state) is saved and a callback function to the VMM 230 is invoked to exit the DBT layer 232 to handle the exception condition. At 414, once the exception condition is handled, execution by the DBT layer 232 resumes at the interrupted point after the exception handling.

(2) In FIG. 4B, at 420, execution causes a hardware exception such as a page fault that is detected within the VMM 230 but outside of the DBT layer 232. As noted above, typically, execution resumes at the interrupted point after handling. However, at 422, if an exception needs to be delivered to the guest OS 224, the VMM 230 calls back to the DBT layer 232 to re-construct the guest-ISA state, (e.g., the IA-32 state). At 424, it then modifies the state to simulate exception delivery. At 426, the VMM 230 restarts the fetch-and-execute loop by passing the control back to the DBT layer 232 after the exception handling.

(3) In FIG. 4C, execution is interrupted by an asynchronous notification destined for the guest OS 224, such as a device interrupt. At 432, the VMM 230 checks if the notification is safe to deliver immediately. If so, at 434, it proceeds as for an exception described in (2) above and FIG. 4B; otherwise, at 436, it requests the DBT layer 232 to halt execution as soon as possible, which invokes a callback to the VMM 230, at the next safe point in order to deliver the notification to the guest OS 224. Again, at 438, execution by the DBT layer 232 resumes at the interrupted point after the exception handling.

As discussed above, hypercalls interrupt IA-32 executions and call back into the VMM 230 for their handling. Such interruptions may be done through software interrupt instructions. The VMM 230 then simply inspects the IA-32 register state and dispatches to the appropriate emulation function. A number of hypercalls are used by the guest kernel of the guest-ISA domain 220, and many of these have more than one sub-operation. Some of these hypercalls are emulated by calling the corresponding APIs of the processor ISA, while others act purely on data maintained within the VMM 230. The VMM 230 also emulates a number of privileged instructions, such as return from interrupt, I/O port accesses, and some control register accesses. This is implemented in a similar manner to any other VMM: by inspecting the instruction at the guest-ISA instruction pointer, and updating guest-ISA register state appropriately.

Accordingly, as described herein, the combination of virtual machine techniques with DBT enables cross-ISA virtualization, wherein a virtual machine or appliance intended for one ISA may be transparently executed on a different ISA (with identical or different OS types), and wherein paravirtualized virtual machines of different ISAs (with identical or different OS types) may run alongside one another on a single physical machine. One of the key customer usage models for virtualization today is consolidation, where the workloads of several smaller servers are combined into one larger server. Currently, the workloads to be consolidated are platform-specific which constrains the choices for purchasing the new server. For example, if a workload contains applications that only run on Windows server on an IA-32 platform, the consolidation server must be capable of running IA-32 Windows applications. However, the selection of "large servers" on the market consists largely of systems built on other ISAs such as Itanium, Power, and SPARC. Though Windows server supports Itanium, many IA-32 Windows applications have never been ported to Itanium. However, the VMM 230 as describe herein allows the workloads of both IA-32 servers and non-IA-32 servers to be consolidated onto more high-end non-IA-32 servers.

Another key value of virtualization is in disconnecting the virtual platform from the physical platform for resource migration. A workload may be transparently and dynamically moved from one platform to another, even without reboot or noticeable downtime. This live migration provides great flexibility in that workloads may be moved to maximize resource utilization, allow for maintenance, reduce power and cooling costs. But one of the not-widely-advertised limitations of migration is that the source and target processors must be identical, or nearly so. Certainly the ISA must be the same. However, as described herein, the novel approach to the design of the VMM 230 allows resource pools with completely different ISAs to be combined into the same pool. Furthermore, this novel approach may be used to combine non-identical similar-ISA pools (such Pentium 4 vs. Pentium 3 applications). Even more aggressively, having a cross-ISA virtual machine migration provides a level of ISA agnosticity that may enable more power-efficient or lower cost general-purpose processors from different markets (e.g., SiByte, PASemi) to support a broader set of applications.

A rapidly growing niche of the virtualization market is the availability of "virtual appliances," or packages of bits combining an OS and an application that are distributed to run on top of a particular VMM product. This greatly reduces installation, hardware, and testing costs for sampling new software. The novel approach to the VMM 230 as described herein may allow commercially available virtual appliances, such as those for IA-32 to run on other platforms.

Another trend in the computing industry is the support for heterogeneous or asymmetric cores in system processors. In these systems, the novel approach of having a binary translation layer combined with the virtual machine layer described herein may enable virtual appliances to be seamlessly migrated between configurations supporting different heterogeneous accelerator cores. Furthermore, this novel approach provides a nexus of translation at the ISA level, which reduces the need to change hardware in order to accommodate virtual machines of different ISAs.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A system for providing virtualization comprising:
   a processor to execute one or more machine-readable instructions, the processor having a native instruction set architecture (ISA); and
   a virtual machine monitor (VMM) to host at least a first virtual machine having a first ISA different from the native ISA, the VMM having integrated therein a first dynamic binary translation (DBT) layer to assist in an execution of a first application of the first ISA in the first virtual machine by the processor having the native ISA, wherein the DBT layer provides dynamic binary translation of a full instruction set architecture that includes both a user ISA and a system ISA, wherein the user ISA includes instructions that are unprivileged and wherein the system ISA includes instructions that are privileged.

2. The system of claim 1, further comprising:
   a plurality of virtual machines hosted by the VMM, wherein the first virtual machine is one of the plurality of virtual machines.

3. The system of claim 2, wherein the plurality of virtual machines include:
   a second virtual machine having a second ISA that is different from the first ISA.

4. The system of claim 3, wherein the second virtual machine having the second ISA that is the same as the native ISA of the processor.

5. The system of claim 3, wherein the first virtual machine operates with one instance of a first operating system (OS) and the second virtual machine operates with another instance of a second OS, wherein the first OS and the second OS are of a same type.

6. The system of claim 3, wherein the first virtual machine operates with one instance of a first operating system (OS) and the second virtual machine operates with another instance of a second OS, wherein the first OS and the second OS are of a different type.

7. The system of claim 1, wherein the VMM further having integrated therein a transformation layer to assist in the execution of the application of the first ISA in the first virtual machine by the processor, wherein the transformation layer handles system-level instructions from the first virtual machine and emulates an application programming interface (API) for the first virtual machine.

8. The system of claim 1, wherein the first virtual machine provides a paravirtualization to emulate the first ISA.

9. The system of claim 3, wherein the VMM further having integrated therein a second DBT layer to assist in an execution of a second application of the second ISA in the second virtual machine by the processor having the native ISA.

10. A method for providing virtualization in a physical machine having at least a processor having a native instruction set architecture (ISA) and operable to execute one or more machine-readable instructions, the method comprising:
    loading components of a virtual machine monitor (VMM) in the system, the components comprising at least VMM runtime components and components for dynamic binary translation (DBT) that provide runtime translation of a binary image from one ISA to another ISA, wherein the DBT provides dynamic binary translation of a full instruction set architecture that includes both a user ISA and a system ISA, wherein the user ISA includes instructions that are unprivileged and wherein the system ISA includes instructions that are privileged; and implementing the VMM as loaded in the system to set up at least a first guest-ISA domain for executing a first application therein in accordance with a first ISA that is different from the native ISA.

11. The method of claim 10, further comprising:

paravirtualizing the first guest domain to make system calls to the VMM; and virtualizing the paravirtualized first guest domain with the VMM by running the DBT components therein to provide runtime translation of a binary image of the first application from the first ISA to the native ISA to execute the first application with the processor.

12. The method of claim 11, wherein running the DBT components in the VMM comprises:

setting up a first-ISA state of the first ISA for the first application;

passing the executing of the first application to the DBT components;

the DBT components dynamically translating the first-ISA state into machine-executable code of the native ISA at runtime; and executing the machine-executable code of the native ISA with the processor.

13. The method of claim 11, further comprising:

monitoring the execution of the first application by the DBT components;

upon determining that there is a runtime exception from the monitoring, handling the runtime exception in the VMM with components other than the DBT components.

14. The method of claim 13, wherein handling the runtime exception in the VMM comprises:

removing control of the execution of the first application by the DBT components;

handling the runtime exception by at least one VMM component other than the DBT components; and returning control of the execution of the first application to the DBT components once the handling of the runtime exception is completed.

15. The method of claim 13, wherein handling the runtime exception in the VMM comprises:

identifying that the runtime exception is a predetermined exception condition;

invoking a call back to the VMM to handle the predetermined exception condition with the VMM components other than the DBT components; and resuming execution of the application by the DBT components once the VMM components finish handling the predetermined exception condition.

16. The method of claim 15, wherein the predetermined exception condition is one involving one of a system call and a hypercall.

17. The method of claim 13, wherein handling the runtime exception in the VMM comprises:

identifying that the runtime exception is a hardware exception for delivery to an operating system used by the first guest domain;

calling back the DBT components to re-construct a first-ISA state of the first application;

modifying the reconstructed first-ISA state to simulate delivery of the hardware exception to the first guest domain; and passing control of the execution of the first application back to the DBT components.

18. The method of claim 13, wherein handling the runtime exception in the VMM comprises:

identifying that the runtime exception is an asynchronous notification destined for an operating system used by the first guest domain;

determining whether the asynchronous notification is safe for immediate delivery to the operating system;

upon the determining that the asynchronous notification is not safe for immediate delivery to the operating system, invoking a call back to the VMM to halt execution of the first application by the DBT components and deliver the asynchronous notification;

resuming execution of the application by the DBT components once the VMM components finish handling the predetermined exception condition.

19. The method of claim 13, wherein handling the runtime exception in the VMM further comprises:

identifying that the runtime exception is an asynchronous notification destined for an operating system used by the first guest domain;

determining whether the asynchronous notification is safe for immediate delivery to the operating system;

upon the determining that the asynchronous notification is safe for immediate delivery to the operating system, a) calling back the DBT components to re-construct a first-ISA state of the first application;

b) modifying the reconstructed first-ISA state to simulate delivery of the asynchronous notification to the first guest domain; and c) passing control of the execution of the first application back to the DBT components.

20. A non-transitory computer readable medium on which is embedded programming code that is executed by a computer processor having a native instruction set architecture (ISA) to:

load components of a virtual machine monitor (VMM) in the system, the components comprising at least VMM runtime components and components for dynamic binary translation (DBT) that provide runtime translation of a binary image from one ISA to another ISA, wherein the DBT provides dynamic binary translation of a full instruction set architecture that includes both a user ISA and a system ISA, wherein the user ISA includes instructions that are unprivileged and wherein the system ISA includes instructions that are privileged; and implement the VMM as loaded in the system to set up at least a first guest-ISA domain for executing a first application therein in accordance with a first ISA that is different from the native ISA.

21. The computer-readable medium of claim 20, wherein the embedded programming code is executed by the computer processor to further:

paravirtualize the first guest domain to make system calls to the VMM; and virtualize the paravirtualized first guest domain with the VMM by running the DBT components therein to provide runtime translation of a binary image of the first application from the first ISA to the native ISA to execute the first application with the processor.

* * * * *